United States Patent Office 3,234,171
Patented Feb. 8, 1966

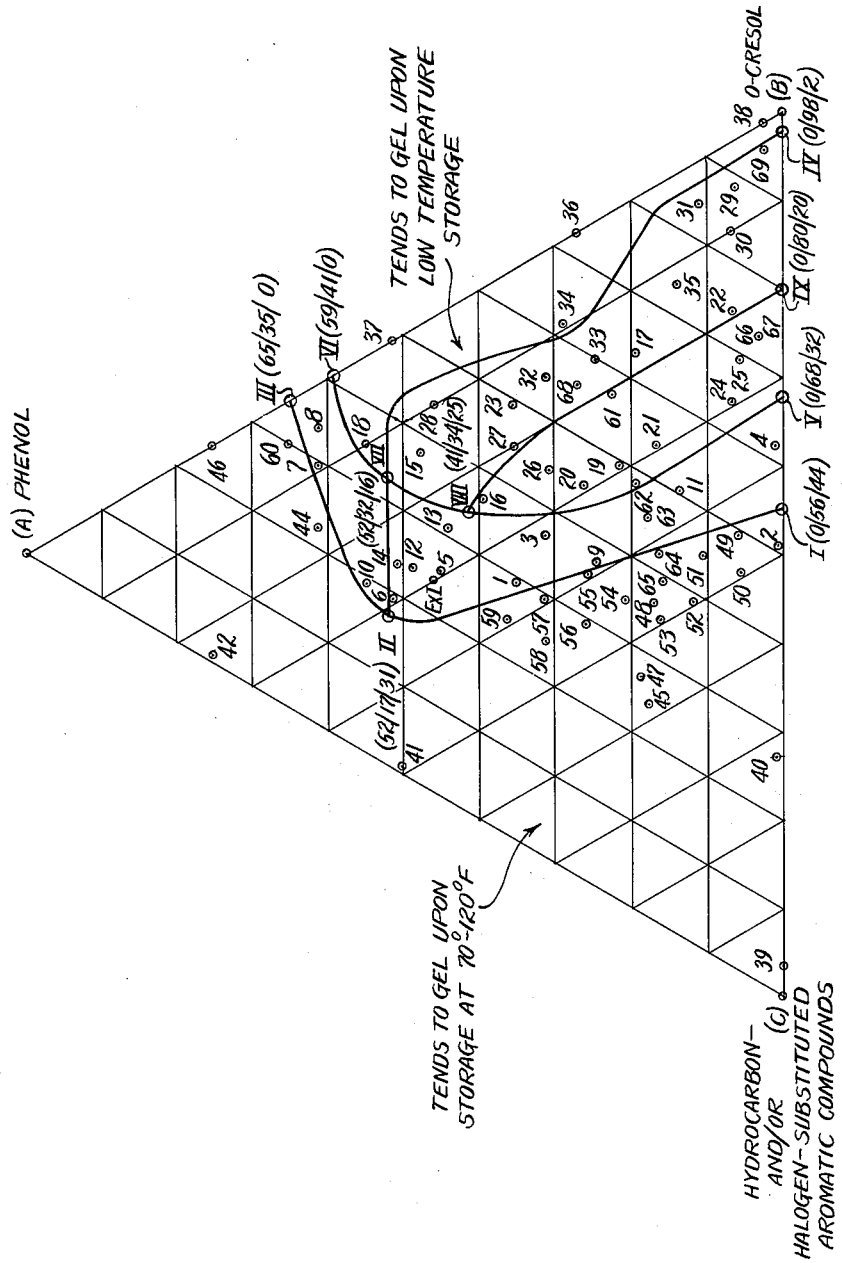

3,234,171
COATING COMPOSITIONS
Ernest C. Koerner and Vello Nolvak, Fort Wayne, Ind., and Henry J. Bach, Mount Lebanon Township, Allegheny County, and William A. Merlack, Ross Township, Allegheny County, Pa.; said Koerner and said Nolvak assignors to Phelps Dodge Copper Products Corporation, New York, N.Y., a corporation of Delaware; said Bach and said Merlack assignors, by mesne assignments, to Socony Mobil Oil Company, Inc., New York, N.Y., a corporation of New York
Filed Nov. 2, 1960, Ser. No. 66,752
16 Claims. (Cl. 260—33.4)

The present invention relates to stable and preferably relatively concentrated liquid solvent solutions of high molecular weight, cold-drawable, essentially linear aromatic polyesters, such as polyethylene terephthalate.

The high molecular weight and essentially linear aromatic polyesters which are the subject of the invention are known compounds and are known to possess excellent physical, mechanical and electrical properties. Unfortunately, the strong tendency of these high molecular weight essentially linear aromatic polyesters to become molecularly oriented, as evidenced by their capacity to be cold drawn into products exhibiting crystallinity, has prevented effective organic solvent solution application. Aside from low solubility, the solutions tended to rapidly become more viscous and even gelatinous and the gelation problem is a progressive one in the sense that the more concentrated solutions gel more rapidly.

The present invention is based on the discovery that phenolic based solvent mixtures containing a substantial proportion of ortho-cresol, preferably a large proportion of ortho-cresol, are effective to dissolve the cold-drawable polyester to provide solutions of substantial concentration which possess good storage stability at room temperature and at moderately elevated temperature.

Another feature of the invention is improved low temperature storage stability obtained by limiting the proportion of ortho-cresol in the phenolic mixture to less than about 98% by weight, as by the inclusion in the mixture of small amounts of other hydrocarbon- and/or halogen-substituted aromatic compounds, preferably substituted phenolic compounds, such as meta, para-cresols, xylenols, and chlorophenols.

The high molecular weight, cold-drawable, essentially linear aromatic polyesters in accordance with the invention are polyesters consisting essentially of the reaction product of iso- and tere-aromatic dibasic compound and lower aliphatic and cyclo aliphatic diols containing from 2–10 carbon atoms. Preferably, and to accentuate polyester linearity and cold drawability, the reaction products of terephthalic acid or its derivatives and straight chain diols having from 2–5 carbon atoms and two primary hydroxyl groups are selected to constitute the polyester. Such polyesters possess the best physical and chemical properties and are the most difficult to place in stable and preferably concentrated solvent solution.

The iso- and tere-aromatic dibasic compounds which may be used are exemplified by terephthalic acid, isophthalic acid, acyl chlorides of these acids, lower alkyl esters of these acids containing from 1–10 carbon atoms in each ester radical (especially dimethyl terephthalate and dimethyl isophthalate) and mixtures thereof. While there are specific differences in the polyester depending upon the aromatic dibasic compound selected and while the required polyesterification procedure and commercial desirability thereof will also vary, depending upon the selection which is made, the polyester produced will possess substantially the same linearity and tendency to be cold-drawable, irrespective of the particular aromatic dibasic compound which is used. The terephthalic polyesters are more highly linear and are preferred because they provide superior properties and because they are more difficultly soluble, emphasizing the importance of the invention.

Various lower aliphatic hydrocarbon diols may be used, the preferred diol being ethylene glycol. 1,4-butanediol, 1,5-pentanediol, 1,4-butene-2-diol, illustrate other preferred diols for use alone or together with ethylene glycol. Other diols which may be used are illustrated by 1,2-propanediol, 1,3-propanediol, 1,6-hexanediol, 1,3-cyclobutane diol, 1,4-cyclohexane diol, 1,4-cyclohexane methanol, etc.

The language "essentially linear" identifies polyesters consisting essentially of iso- and tere-aromatic dibasic compound and lower aliphatic diols. It should be understood, however, that minor amounts of other components such as adipic acid, glycerin or orthophthalic acid may be present so long as the proportion thereof is too small to significantly alter the essentially linear and cold-drawable character of the polyester. The presence of substantial proportions of other components, as indicated above, tends to significantly lower the melting point of the polyester and the invention is directed to high molecular weight polyesters which are essentially linear, as indicated by a melting point in excess of 200° C., preferably in excess of 240° C.

The combination of high molecular weight and polyester linearity in accordance with the invention is intended to provide a cold-drawable polymeric product, and this raises the problem of the invention, namely, low solubility in organic solvents and poor stability in solution.

While cold-drawability is a sufficient measure of high molecular weight and polyester linearity to satisfy the requirements of the invention, numerical limits of relative viscosity can also be assigned. Relative viscosity is defined as the ratio of the efflux time of a polymer solution to the efflux time of the pure solvent. Conveniently, the polyester is placed in a solution containing 1 gram of polyester per deciliter of solvent, the solvent being a 60/40 mixture of phenol and tetrachlorethane. Using viscosity measurements made at 77° F., in a size 200 Ostwald-Kannon-Fenske viscometer, it has been found that polyesters having a relative viscosity in excess of 1.3, preferably in excess of 1.5, are adapted for the purposes of the invention. A relative viscosity of about 3.0 appears to represent an approximate upper limit of molecular weight from the standpoint of the feasibility of providing high molecular weight polyesters.

The invention is concerned with organic solvent solutions which contain a sufficient proportion of dissolved polyester to be useful in practice. Thus, the solution should contain at least 5% by weight of dissolved polyester and the solution should be stable, e.g., avoid gelation, or large increase in viscosity when allowed to stand for an extended period of time at temperatures in the range of 70–120° F., preferably in the range of 0–120° F. As a practical minimum, the liquid solution should not increase in viscosity by an amount in excess of 50% of the original viscosity when maintained at a temperature of from 70–120° F. for a period of at least 5 days. Preferably, the solutions are more concentrated, e.g., the solutions contain at least 10% by weight of dissolved polyester, desirably at least 13% by weight of dissolved polyester. As will be evident, the problem of maintaining solution viscosity and avoiding gelation becomes more difficult as the concentration of the solution is increased. Preferred solutions in accordance with the invention and containing at least 10% by weight of dissolved polyester, are stable at temperatures of 70–120° F. for periods in excess of 20 days. Still more preferably, the solvent solutions of the invention are desirably also resistant to prolonged exposure to freezing conditions, satisfactory resistance to freezing being the absence of gelled particles from the solution after freezing exposure for at least one day followed by thawing to 86° F.

In accordance with the invention, the solvent medium which is selected is preferably completely constituted by aromatic compounds, though minor proportions of other organic solvents may be present. At least 70% by weight of the solvent medium should be constituted by a plurality of phenolic compounds as follows: (A) from 0–65% by weight of phenol; (B) from 17–100% by weight of ortho-cresol; and (C) from 0–44% by weight of aliphatic hydrocarbon- and/or halogen-substituted aromatic compounds selected from the group consisting of benzene and phenol. The preferred aromatic compounds are substituted phenolic compounds, desirably meta-cresol, para-cresol, and mixtures thereof. It is further preferred that compounds falling within the description of component (C), other than meta-cresol and para-cresol, be limited to a maximum of 20% by weight, preferably to a maximum of 15% by weight, but this is not essential. Moreover, the relative proportions of these components (A), (B) and (C) must be inter-related to achieve limited viscosity stability and gelation resistance at temperatures of 70–120° F., as shown in the accompanying graph by the area encompassed by the line I–II–III–B–I.

To obtain superior viscosity stability and resistance to gelation at temperatures in the range of 70–120° F., the proportion of phenol, ortho-cresol and other substituted aromatic compounds must be more closely correlated as follows: (A) from 0–59% by weight of phenol; (B) from 32–100% by weight of ortho-cresol; and (C) from 0–32% by weight of substituted aromatic compounds other than ortho-cresol. Still further, the relative proportions of components (A), (B), and (C) must be inter-related to achieve superior stability as shown in the accompanying graph by the area encompassed by the line V–VIII–VII–VI–B–V.

It is frequently desirable, because of the possibility of encountering freezing conditions, to provide stability over the range of from 0–120° F. In order to provide limited resistance to freezing conditions, less phenol can be tolerated, the proportions of ortho-cresol are more restrictive and at least 2% by weight of the mixture of phenolic compounds must be constituted by component (C). More particularly, the following proportions are required: (A) from 0–52% by weight of phenol; (B) from 17–98% by weight of ortho-cresol; and (C) from 2–44% by weight of substituted aromatic compounds. Still further, the weight proportions of components (A), (B), and (C) must be inter-related as shown in the accompanying graph by the area encompassed by the line I–II–VII–IV–I.

When it is desired to combine limited freeze resistance with superior stability at temperatures of from 70–120° F., a larger minimum proportion of ortho-cresol is required and the proportion of component (C) must be more carefully regulated. Specifically, the proportions must be as follows: (A) from 0–52% by weight of phenol; (B) from 32–98% by weight of ortho-cresol; and (C) from 2–32% by weight of substituted aromatic compounds; and the proportions must also be correlated as shown in the accompanying graph by the area encompassed by the line V–VIII–VII–IV–V.

In some instances, it is desired to combine superior viscosity stability and gelation resistance at temperatures of from 70–120° F., with superior resistance to the formation of gel particles on repeated freezing and thawing. When such demanding characteristics are imposed, the proportions required by the invention become even more limited as follows: (A) from 0–41% by weight of phenol; (B) from 34–80% by weight of ortho-cresol; and (C) from 20–32% by weight of substituted aromatic compounds; and the relative proportions of the components must be interrelated as shown in the accompanying graph by the area encompassed by the line V–VIII–IX–V.

The accompanying graph is a conventional triangulation divided into units of 10 percent. Each apex of the triangle identifies one of the three pure components and each leg of the triangle indicates the absence of the component at the opposite apex. Each experiment listed hereinafter in Tables I and II is shown on the triangulation with its identifying number. Additionally, certain significant points are identified by Roman numerals, the precise proportions denoted being shown in parenthesis in which weight percent is set forth respectively for the components A, B and C.

Referring more particularly to the accompanying graph, this graph was prepared using data obtained by testing 13% by weight solids solution of polyethylene terephthalate polyester in various solvent mixtures as is illustrated in Example I, but the lines shown on the graph are applicable to define stable solutions containing a substantial proportion, e.g., more than 5% by weight, of dissolved high molecular weight, cold-drawable, essentially linear aromatic polyester as defined herein.

To facilitate understanding of the graph, when the proportion of component (C) is excessive or when the proportion of phenol is excessive, the stability of the solutions at room temperature or slightly elevated temperature is markedly decreased. Similarly, when the proportion of ortho-cresol is too high or when the proportion of component (C) is too low, the capacity of the solution to resist formation of gel particles upon exposure to freezing temperatures is markedly reduced.

It is of interest to note that when the solvent mixture contains an unduly large proportion of phenol, the product is a solid, e.g., it is not a liquid solution and hence is not useful in accordance with the invention which is directed to solutions which are liquid at normal room temperature.

As previously indicated, the preferred substituted aromatic compounds constituting component (C) of the mixture of phenolic compounds are meta-cresol, para-cresol and mixtures thereof. These preferred cresols may be replaced in whole or in part by other hydrocarbon- and/or halogen-substituted aromatic compounds, preferably phenolic compounds. Suitable substituted compounds other than meta- or para-cresol which can be used for component (C) are xylenols, ethyl phenols, halogen-substituted phenols such as ortho-chlorophenol and monochloro cresols, and substituted benzene compounds such as monochlorobenzene, xylene and 1,2,3,4-tetrahydronaphthalene.

It should be understood that the stability of a given solution will vary inversely with the concentration of polyester in the solvent medium. Thus, as the concentration of polyester increases or when the requirements insisted upon for storage stability are made more rigorous, it becomes necessary to employ preferred compositions as described hereinbefore.

It is preferred, but not essential, that the solvent medium be entirely constituted by components (A), (B) and (C). Thus, minor proportions of the solvent medium may be constituted by aliphatic solvents, these being illustrated by ethylene dichloride and tetrachlorethane. With respect to the inclusion of solvents other than components (A), (B) and (C) specified, it will be understood that the essential solvent activity and solution stability is provided by the specified mixtures of phenolic compounds, the proportions of components (A), (B) and (C) being inter-related as shown in the graph.

It should be kept in mind that some of the solvents which may be present in accordance with the invention, especially chlorophenols, may introduce undesirable side effects, e.g., polyester degradation at excessive dissolving temperatures and corrosive action upon the metal surface to be coated. Accordingly, while chlorinated phenols may be used to assist in providing the combination of solubility and solution stability desired by the invention, the optional presence of these components which is permitted by the invention is not to be construed as being a recommendation to select these from among the various substituted aromatic compounds which are available in accordance with the invention. Moreover, chlorinated phenols are expensive and, from this standpoint alone, it is not desirable to employ excessive proportions thereof, even though some chlorinated phenols are good solvents for polyesters.

The polyester may be dissolved in the solvent mixture in any suitable manner, it being normally preferred to use heat and agitation to facilitate dissolution.

The essentially linear polyester goes into solution essentially in its amorphous and non-crystalline condition. It is the tendency of these amorphous, but linear, polyesters to become crystalline under the conditions of molecular mobility provided by the existence of a solution which appears to have created the problem of the invention. In the light of recognition by the art that the provision of relatively concentrated stable solutions of cold-drawable and essentially linear aromatic polyester is not feasible, the present invention represents a significant and unexpected advance in the art.

The solutions provided by the invention are useful for coating to form free films or adherent coatings as may be desired. In such applications, the well recognized and highly desirable physical, chemical and electrical properties of the essentially linear polyesters are realized from practical solvent solutions. It is particularly intended to employ the solvent solutions in accordance with the invention for the coating of metal in the form of sheets or wire, but the invention is not limited in this manner. Moreover, the coating solutions of the invention may be desirably applied as topcoats over other coating compositions to provide the benefits inherent in the essentially linear polyesters which are used. It is especially preferred to apply the solutions of the invention as a topcoat over electrical wire which has had applied to it an insulating coating of a more soluble polyester, especially a polyester of terephthalic or isophthalic acid or a derivative thereof as previously indicated with a glycol containing from 2-10 carbon atoms in the molecule and a substantial proportion of some additional component such as adipic acid as taught in United States Patent 2,683,100 or a proportion of glycerol as taught, for example, in United States Patents 2,889,304; 2,900,356; 2,935,487 and 2,936,296. Most desirably, the glycerol-containing copolyester is provided with a small excess of hydroxyl functionality and is cured by a cross-linking reaction. The preferred cross-linking reaction is effected using less than a stoichiometric proportion of an organic polyisocyanate.

The production of a concentrated solvent solution in accordance with the present invention is illustrated in Example I which follows in which an essentially linear polyester of ethylene glycol and dimethyl terephthalate having a relative viscosity of 1.63 measured as indicated hereinbefore, and a melting point in the range of 257–265° C. and which is cold-drawable is dissolved to provide a stable solution containing 13% by weight of dissolved polyester based on the total weight of the solution. While the stable solutions provided by the invention are substantially independent of concentration and the specific composition of the essentially linear polyester which is employed, it is convenient to check stability by dissolving the polyester in various solvent solutions using the procedure of Example I and then checking stability after exposure to various storage temperatures. The results obtained in numerous tests are tabulated in Table I which follows, the various test compositions being numbered and the corresponding numbers being positioned on the accompanying graph to show the tabulated compositions with respect to the claimed proportions.

EXAMPLE I 13 parts by weight of ethylene glycol dimethyl terephthalate essentially linear polyester having a relative viscosity of 1.63 and a melting point in the range of 257–265° C., and which is cold-drawable, is mixed with 87 parts of a solvent system consisting of 45% by weight of phenol; 25% by weight of ortho-cresol; and 30% by weight of an approximately 60/40 weight ratio mixture of meta- and para-cresol containing 1% by weight of xylenols, principally 2,4-xylenol. This mixture was heated to a temperature of 240–250° F. and held at this temperature for 30 minutes with mild agitation to provide a solution.

On cooling to room temperature, the solution had an initial viscosity of 80 seconds #4 Ford Cup at 86° F. After 8 days the viscosity had increased, on storage at room temperature, to 125 seconds #4 Ford Cup at 86° F. At the end of 10 days, the room temperature sample had gelled. A separate sample placed in 0° F. storage for 5 days and then warmed to 86° F. passed two such cycles and contained gel particles at the end of the third cycle.

Using the same procedure illustrated in Example I, a number of solutions were prepared using different proportions of phenol, ortho-cresol and 60/40 weight ratio mixture of meta-cresol/para-cresol containing 1% by weight of xylenols, principally 2,4-xylenol. The results obtained in this manner are reported in Table I which follows:

*Table I*

| | Phenol (percent) | O-Cresol (percent) | m,p-Cresols +xylenols (percent) | Init. Visc. (Secs. #4 Ford Cup at 86° F.) | Days at RT to 50% visc. increase | Days to Gel at RT | Freeze-Thaw Cycles Passed |
|---|---|---|---|---|---|---|---|
| 1 | 35.5 | 29.7 | 34.8 | 77 | 5 | 10 | 2 |
| 2 | 1.2 | 50.6 | 48.2 | 100 | 5–12 | 10 | 5 |
| 3 | 31.8 | 37.1 | 31.1 | 77 | 5–12 | 10 | 4 |
| 4 | 0.9 | 61.8 | 37.3 | 102 | 5–12 | 10 | 6 |
| 5 | 45.4 | 24.8 | 29.8 | 81 | 5–12 | 10 | 2 |
| 6 | 50.3 | 19.9 | 29.8 | 69 | 5–12 | 10 | 1 |
| 7 | 60.5 | 29.6 | 9.9 | 69 | 5–12 | 10 | 0 |
| 8 | 60.5 | 34.5 | 5.0 | 70 | 5–12 | 10 | 0 |
| 9 | 24.0 | 37.1 | 38.9 | 92 | 5–12 | 10 | 6 |
| 10 | 55.3 | 19.8 | 24.9 | 73 | 12 | 15 | 0 |
| 11 | 13.8 | 50.1 | 36.1 | 97 | 12–16 | 15 | 6 |
| 12 | 47.3 | 24.7 | 28.0 | 85 | 12–16 | 15 | 1 |
| 13 | 43.4 | 31.0 | 25.6 | 85 | 12–16 | 20 | 5 |
| 14 | 50.4 | 24.7 | 24.9 | 71 | 16 | 20 | 1 |
| 15 | 47.5 | 37.0 | 15.5 | 77 | 20–25 | 25 | 5 |
| 16 | 39.6 | 37.1 | 23.3 | 82 | 20–25 | 30 | 4 |
| 17 | 19.7 | 61.6 | 18.7 | 80 | 25 | 40 | 1 |
| 18 | 55.5 | 34.6 | 9.9 | 72 | 25–30 | 30 | 0 |
| 19 | 20.8 | 49.4 | 29.8 | 74 | 30 | 40 | 6 |
| 20 | 25.7 | 44.5 | 29.8 | 81 | 30 | 40 | 6 |
| 21 | 15.8 | 54.4 | 29.8 | 75 | 30 | >40 | 5 |
| 22 | 7.4 | 73.9 | 18.7 | 89 | 30–40 | 45 | 1 |
| 23 | 34.0 | 49.2 | 16.8 | 84 | 30–40 | 50 | 1 |

*Table I—Continued*

| | Phenol (percent) | O-Cresol (percent) | m,p-Cresols +xylenols (percent) | Init. Visc. (Secs. #4 Ford Cup at 86° F. | Days at RT to 50% visc. increase | Days to Gel at RT | Freeze-Thaw Cycles Passed |
|---|---|---|---|---|---|---|---|
| 24 | 6.0 | 64.2 | 29.8 | 81 | 30–40 | >40 | 6 |
| 25 | 6.1 | 69.0 | 24.9 | 81 | 30–40 | 40 | 5 |
| 26 | 30.7 | 44.4 | 24.9 | 79 | 30–40 | >40 | 3 |
| 27 | 35.7 | 44.4 | 19.9 | 77 | >40 | >40 | 2 |
| 28 | 45.7 | 44.4 | 9.9 | 74 | >40 | >40 | 2 |
| 29 | 6.4 | 88.6 | 5.0 | 70 | >40 | >40 | 2 |
| 30 | 6.3 | 83.8 | 9.9 | 73 | >40 | >40 | 1 |
| 31 | 11.3 | 83.7 | 5.0 | 74 | >40 | >40 | 1 |
| 32 | 30.8 | 54.3 | 14.9 | 77 | >40 | >40 | 1 |
| 33 | 24.0 | 60.0 | 16.0 | 77 | >40 | >40 | 2 |
| 34 | 29.0 | 61.6 | 9.4 | 78 | 40–60 | 60 | 0 |
| 35 | 14.4 | 73.6 | 12.0 | 72 | >60 | >60 | 1 |
| 36 | 26.9 | 73.1 | | 80 | >60 | >60 | 0 |
| 37 | 51.3 | 48.7 | | 78 | >60 | >60 | 0 |
| 38 | 2.5 | 97.5 | | 77 | >65 | >65 | 0 |
| 39 | | 3.7 | 96.3 | 120 | <5 | 5 | |
| 40 | 0.6 | 27.2 | 72.2 | 107 | <5 | 5 | |
| 41 | 50.0 | 1.8 | 48.2 | 96 | <5 | 5 | |
| 42 | 75.0 | 0.9 | 24.1 | 88 | <5 | 5 | |
| 43 | 25.0 | 2.8 | 72.2 | 105 | <5 | 5 | |
| 44 | 60.8 | 22.8 | 16.4 | 85 | <5 | 5 | |
| 45 | 17.6 | 24.4 | 58.0 | 100 | <5 | 5 | |
| 46 | 75.6 | 24.4 | | 88 | <5 | 1 | |
| 47 | 19.4 | 26.4 | 54.2 | 94 | <5 | 5 | 2 |
| 48 | 16.1 | 37.3 | 46.6 | 89 | <5 | 5 | 5 |
| 49 | 5.8 | 49.4 | 44.8 | 83 | <5 | 5 | 4 |
| 50 | 5.7 | 44.5 | 49.8 | 92 | <5 | 5 | 1 |
| 51 | 10.7 | 44.5 | 44.8 | 92 | <5 | 5 | 2 |
| 52 | 10.6 | 39.6 | 49.8 | 85 | <5 | 5 | 4 |
| 53 | 15.5 | 34.7 | 49.8 | 91 | <5 | 5 | 1 |
| 54 | 20.5 | 34.7 | 44.8 | 89 | <5 | 5 | 4 |
| 55 | 25.5 | 34.7 | 39.8 | 87 | <5 | 5 | 5 |
| 56 | 25.5 | 29.7 | 44.8 | 88 | <5 | 5 | 3 |
| 57 | 30.5 | 29.7 | 39.8 | 88 | <5 | 5 | >6 |
| 58 | 30.4 | 24.8 | 44.8 | 85 | <5 | 5 | 1 |
| 59 | 35.4 | 24.8 | 39.8 | 85 | <5 | 5 | 2 |
| 60 | 65.5 | 29.5 | 5.0 | 71 | <5 | 5 | 0 |

In Table II which follows, there is grouped together the results of a series of further experiments illustrating the effect of the presence of various proportions of xylenols in the solvent mixture, the experiments being performed as described in Example I.

TABLE II

| | Phenol (percent) | o-Cresol (percent) | m,p-Cresol [1] (percent) | Xylenols [2] (percent) | Init. Visc. (Secs. #4 Ford Cup at 86° F.) | Final Visc. [3] (Secs. #4 Ford Cup at 75° F.) | Freeze-Thaw Cycles Passed |
|---|---|---|---|---|---|---|---|
| 61 | 22.8 | 57.0 | 13.3 | 6.9 | 90 | 92 | |
| 62 | 19.2 | 48.0 | 11.2 | 21.6 | 93 | 101 | |
| 63 | 18.0 | 45.0 | 10.5 | 26.5 | 92 | 135 | |
| 64 | 16.8 | 42.0 | 9.8 | 31.4 | 97 | 245 | |
| 65 | 15.6 | 39.0 | 9.1 | 36.3 | 92 | Solid Gel | |
| 66 | 3.8 | 73.0 | 19.8 | 3.4 | 76 | ([4]) | >5 |
| 67 | 3.8 | 73.1 | 22.7 | 0.4 | 76 | ([4]) | 4 |
| 68 | 26.9 | 56.6 | 14.2 | 2.3 | 70 | ([4]) | 1 |

[1] 60/40 weight ratio mixture of meta-cresol/para-cresol.
[2] Approximately equiweight mixture of 2,4- and 2,5-xylenols.
[3] After storage for 25 days at 86° F.
[4] Required more than 25 days to gel.

Reference is made to experiment 38 in Table I which shows that ortho-cresol modified with 2.5% of phenol possesses excellent storage stability at 86° F., but poor freeze-thaw stability. To contrast with this, solvent mixtures containing 95% of ortho-cresol, 2.5% of phenol and 2.5% of various compounds falling within component (C) of the invention were produced and Example I repeated, but at 16% of dissolved resin solids. In separate experiments, monochlorobenzene, tetrahydronaphthalene, an equiweight mixture of 2,4- and 2,5-xylenols, and p-chlorophenol were used, the amount being 2.5%, these experiments all being identified as experiment 69 on the graph. In each instance, storage of the solutions for 15 days at 86° F. failed to cause gelation, thus maintaining storage stability at 86° F. However, each of the solutions passed 1 freeze-thaw cycle, whereas, in the absence of the additional component (C), and even at lower solids content, experiment 38 failed to pass a single freeze-thaw cycle.

The invention is defined in the claims which follow.

We claim:
1. A liquid organic solvent solution stable at temperatures of from 0–120° F. of high molecular weight, cold-drawable, essentially linear aromatic polyester having a melting point in excess of 200° C. and consisting essentially of the reaction product of iso- and tere-aromatic dicarboxylic compound with lower aliphatic diol containing from 2–10 carbon atoms in the molecule, said polyester being dissolved in an amount of at least 5% by weight, based on the weight of the solution, in a solvent medium consisting essentially of: (A) from 0–52% by weight of phenol; (B) from 17–98% by weight of ortho-cresol; and (C) from 2–44% by weight of substituted aromatic compounds other than o-cresol selected from the group consisting of aliphatic hydrocarbon- and halogen-substituted phenol and correspondingly substituted benzene, the proportions of said components (A), (B), and (C) in said solvent medium falling within the area encompased by the line I–II–VII–IV–I of the accompanying graph.

2. A liquid organic solvent solution as recited in claim 1 in which said aromatic dicarboxylic compound is selected from the group consisting of terephthalic acid, isophthalic acid, acyl chlorides of these acids, lower alkyl esters of these acids and mixtures thereof.

3. A liquid organic solvent solution as recited in claim 1 in which said polyester has a relative viscosity measured at 77° F. in a 1 gram per deciliter solvent solution in a 60/40 mixture of phenol and tetrachlorethane in excess of 1.3.

4. A liquid organic solvent solution as recited in claim 3 in which the relative viscosity of said polyester is in excess of 1.5.

5. A liquid organic solvent solution as recited in claim 1 in which said solution contains dissolved therein at least 10% by weight of said polyester.

6. A liquid organic solvent solution as recited in claim 1 in which said dicarboxylic compound consists essentially of terephthalic dicarboxylic compound and said aliphatic diol consists essentially of straight chain diol having from 2–5 carbon atoms in the molecule and two primary hydroxyl groups, said polyester having a melting point in excess of 240° C.

7. A liquid organic solvent solution as recited in claim 1 in which said diol is ethylene glycol and said polyester has a relative viscosity measured at 77° F. in a 1 gram per deciliter solvent solution in a 60/40 mixture of phenol and tetrachlorethane in excess of 1.5.

8. A liquid organic solvent solution having superior stability at temperatures of from 70–120° F. and effective stability at temperatures as low as 0° F., of high molecular weight, cold-drawable, essentially linear aromatic polyester having a melting point in excess of 200° C. and consisting essentially of the reaction product of iso- and tere-aromatic dicarboxylic compound with lower aliphatic diol containing from 2–10 carbon atoms in the molecule, said polyester being dissolved in an amount of at least 5% by weight, based on the weight of the solution, in a solvent medium consisting essentially of: (A) from 0–52% by weight of phenol; (B) from 32–98% by weight of ortho-cresol; and (C) from 2–32% by weight of substituted aromatic compounds other than o-cresol selected from the group consisting of aliphatic hydrocarbon- and halogen-substituted phenol and correspondingly substituted benzene, the proportions of said components (A), (B), and (C) in said solvent medium falling within the area encompassed by the line

V–VIII–VII–IV–V of the accompanying graph.

9. A liquid organic solvent solution as recited in claim 8 in which said component (C) consists of alkyl-substituted phenol.

10. A liquid organic solvent solution having superior stability at temperatures of from 0–120° F. of high molecular weight, cold-drawable, essentially linear aromatic polyester having a melting point in excess of 200° C. and consisting essentially of the reaction product of iso- and tere-aromatic dicarboxylic compound with lower aliphatic diol containing from 2–10 carbon atoms in the molecule, said polyester being dissolved in an amount of at least 5% by weight, based on the weight of the solution, in a solvent medium consisting essentially of: (A) from 0–41% by weight of phenol; (B) from 34–80% by weight of ortho-cresol; and (C) from 20–32% by weight of substituted aromatic compounds other than o-cresol selected from the group consisting of aliphatic hydrocarbon- and halogen-substituted phenol and correspondingly substituted benzene, the proportion of said substituted compounds in excess of 15%, based on the combined weight of (A), (B), and (C), being selected from the group consisting of meta-cresol, para-cresol and mixtures thereof, the proportions of said components (A), (B), and (C) in said solvent medium falling within the area encompassed by the line V–VIII–IX–V of the accompanying graph.

11. A liquid organic solvent solution as recited in claim 10 in which said component (C) consists essentially of alkyl-substituted phenol, and said polyester consists essentially of the reaction product of aromatic dicarboxylic terephthalic compound and lower aliphatic diol containing from 2–5 carbon atoms in the molecule and two primary hydroxyl groups, said polyester being dissolved in an amount of at least 10% by weight and having a melting point in excess of 240° C. and a relative viscosity measured at 77° F. in a 1 gram per deciliter solvent solution in a 60/40 mixture of phenol and tetrachlorethane in excess of 1.5.

12. A liquid organic solvent solution as recited in claim 1 in which the proportion of said component (C) in excess of 20%, based on the combined weights of said components (A) (B) and (C), is selected from the group consisting of m-cresol p-cresol and mixtures thereof.

13. A liquid organic solvent solution as recited in claim 1 in which said component (C) consists essentially of m-cresol and p-cresol and mixtures thereof.

14. A liquid organic solvent solution stable at temperatures of from 0–120° F. of high molecular weight, cold-drawable, essentially linear aromatic polyester having a melting point in excess of 200° C. and consisting essentially of the reaction product of iso- and tere-aromatic dicarboxylic compound with lower aliphatic diol containing from 2–10 carbon atoms in the molecule, said polyester being dissolved in an amount of at least 5% by weight, based on the weight of the solution, in a solvent medium consisting essentially of: (A) from 0–52% by weight of phenol; (B) from 17–98% by weight of ortho-cresol; and (C) from 2–44% by weight of substituted aromatic compounds other than ortho-cresol selected from the group consisting of methyl, ethyl, and halogen-substituted phenol and correspondingly substituted benzene, the proportions of said components (A), (B), and (C) in said solvent medium falling within the area encompassed by the line I–II–VII–IV–I of the accompanying graph.

15. A liquid organic solvent solution stable at temperatures of from 0–120° F. of high molecular weight, cold-drawable, essentially linear aromatic polyester having a melting point in excess of 200° C. and consisting essentially of the reaction product of iso- and tere-aromatic dicarboxylic compound with lower aliphatic diol containing from 2–10 carbon atoms in the molecule, said polyester being dissolved in an amount of at least 5% by weight, based on the weight of the solution, in a solvent medium consisting essentially of: (A) from 0–52% by weight of phenol; (B) from 17–98% by weight of ortho-cresol; and (C) from 2–44% by weight of substituted aromatic compounds other than ortho-cresol selected from the group consisting of lower alkyl and halogen-substituted phenol and correspondingly substituted benzene, the proportions of said components (A), (B), and (C) in said solvent medium falling within the area encompassed by the line I–II–VII–IV–I of the accompanying graph.

16. A liquid organic solvent solution stable at temperatures of from 0–120° F. of high molecular weight, cold-drawable, essentially linear aromatic polyester having a melting point in excess of 200° C. and consisting essentially of the reaction product of iso- and tere-aromatic dicarboxylic compound with lower aliphatic diol containing from 2–10 carbon atoms in the molecule, said polyweight, based on the weight of the solution, in a solvent ester being dissolved in an amount of at least 5% by medium consisting essentially of: (A) from 0–52% by weight of phenol; (B) from 17–98% by weight of ortho-cresol; and (C) from 2–44% by weight of substituted aromatic compound selected from the group consisting of m- and p-cresol, xylenols, ethyl phenols, halogen-substituted phenols, correspondingly substituted benzene compounds and 1,2,3,4-tetrahydronapththalene, the proportions of said components (A), (B), and (C) in said solvent medium falling within the area encompassed by the line

I–II–VII–IV–I of the accompanying graph.

(References on following page)

References Cited by the Examiner

UNITED STATES PATENTS

| | | | |
|---|---|---|---|
| 2,497,376 | 2/1950 | Swallow et al. | 260—33.8 XR |
| 2,878,201 | 3/1959 | Beindorff et al. | 260—33.4 |
| 2,889,304 | 6/1959 | Sheffer et al. | 260—33.4 |
| 2,924,500 | 2/1960 | Huffman et al. | 260—33.4 |
| 2,982,754 | 5/1961 | Sheffer et al. | 260—33.4 |
| 3,022,200 | 2/1962 | Koerner et al. | 260—33.4 |
| 3,141,859 | 7/1964 | Sheffer et al. | 260—33.4 |

OTHER REFERENCES

Condensed Chemical Dictionary: 6th Ed. Reinhold, 1956.

MORRIS LIEBMAN, *Primary Examiner*.

DANIEL ARNOLD, LESLIE H. GASTON, *Examiners*.

R. C. STEWART, D. W. ERICKSON, K. B. CLARKE, *Assistant Examiners*.